United States Patent
Yamamura (10) Patent No.: US 11,048,778 B2
(45) Date of Patent: Jun. 29, 2021

(54) APPLICATION PROGRAM

(71) Applicant: Artis Co., Ltd., Tokyo (JP)

(72) Inventor: Shoichi Yamamura, Tokyo (JP)

(73) Assignee: Artis Solutions Co., Ltd, Tokyo (JP)

( * ) Notice: Subject to any disclaimer, the term of this patent is extended or adjusted under 35 U.S.C. 154(b) by 395 days.

(21) Appl. No.: 15/318,150

(22) PCT Filed: Jun. 3, 2015

(86) PCT No.: PCT/JP2015/066115
§ 371 (c)(1),
(2) Date: Dec. 12, 2016

(87) PCT Pub. No.: WO2015/190371
PCT Pub. Date: Dec. 17, 2015

(65) Prior Publication Data
US 2017/0116395 A1 Apr. 27, 2017

(30) Foreign Application Priority Data
Jun. 13, 2014 (JP) .............................. JP2014-122326

(51) Int. Cl.
*G06F 21/12* (2013.01)
*H04L 9/32* (2006.01)

(52) U.S. Cl.
CPC ................ *G06F 21/12* (2013.01); *H04L 9/32* (2013.01); *H04L 9/3263* (2013.01); *G06F 2221/0735* (2013.01)

(58) Field of Classification Search
CPC .......... G06F 21/12; H04L 9/32; H04L 9/3263
(Continued)

(56) References Cited

U.S. PATENT DOCUMENTS 7,194,623 B1 * 3/2007 Proudler ............... G06F 21/552
710/261
2004/0039706 A1 * 2/2004 Skowron ................ G06Q 10/10
705/51
(Continued)

FOREIGN PATENT DOCUMENTS

JP 2009080772 A2 4/2009
JP 2009169661 A2 7/2009
(Continued)

OTHER PUBLICATIONS

England, "A Trusted Open Platform", Jul. 2003, IEEE, pp. 55-62 (Year: 2003).*
(Continued)

*Primary Examiner* — Taghi T Arani
*Assistant Examiner* — Gregory A Lane
(74) *Attorney, Agent, or Firm* — Rankin, Hill & Clark LLP (57) ABSTRACT

An operating system, when having incorporated data, with a certificate attached, for limiting a function of copying a screen, limits the function of the operating system and when receiving a request for a result of an inspection to determine whether the incorporated data is valid, sends out the result of the inspection in response to the request. An application program makes a request to the operating system for the result of the inspection of the data incorporated in the operating system at startup or return from a background processing. When an inspection result sent from the operating system indicates that the data is invalid, the application program forbids a display control means to display a given screen and instructs the operating system to incorporate a valid data therein. When the inspection result indicates that the data is valid, the application program makes the display means display the given screen.

14 Claims, 7 Drawing Sheets

(58) Field of Classification Search
USPC .......................................................... 726/22
See application file for complete search history.

(56) References Cited

U.S. PATENT DOCUMENTS

| | | | |
|---|---|---|---|
| 2005/0154875 A1* | 7/2005 | Chao .................... | G06F 21/602 |
| | | | 713/156 |
| 2005/0216760 A1* | 9/2005 | Rabin ................ | G06F 9/44521 |
| | | | 726/22 |
| 2005/0223415 A1* | 10/2005 | Oho .................... | G06F 21/6254 |
| | | | 726/27 |
| 2005/0265548 A1* | 12/2005 | Tsuchimura ............ | G06F 21/10 |
| | | | 380/201 |
| 2009/0204818 A1* | 8/2009 | Shin ........................ | G06F 21/57 |
| | | | 713/176 |
| 2009/0228704 A1* | 9/2009 | de Atley ............... | H04L 9/3247 |
| | | | 713/156 |
| 2010/0011446 A1* | 1/2010 | Klucher ................. | G06F 21/10 |
| | | | 726/27 |
| 2010/0106977 A1* | 4/2010 | Persson .................. | G06F 21/54 |
| | | | 713/189 |
| 2010/0274903 A1* | 10/2010 | Wookey ................ | G06F 3/1454 |
| | | | 709/227 |
| 2011/0273627 A1* | 11/2011 | Tsuji .................. | H04N 5/44513 |
| | | | 348/739 |
| 2012/0226895 A1 | 9/2012 | Linsley | |
| 2013/0145468 A1* | 6/2013 | Martin .................... | G06F 21/31 |
| | | | 726/23 |
| 2015/0095648 A1* | 4/2015 | Nix ......................... | H04L 9/085 |
| | | | 713/170 |

FOREIGN PATENT DOCUMENTS

| | | |
|---|---|---|
| JP | 2012038193 A2 | 2/2012 |
| JP | 2012088765 A2 | 5/2012 |
| JP | 5311525 | 10/2013 |
| JP | 2014507043 | 3/2014 |

OTHER PUBLICATIONS

International Search Report dated Sep. 1, 2015 filed in PCT/JP2015/066115.

* cited by examiner

APPLICATION PROGRAM

TECHNICAL FIELD

The present invention relates to an application program that causes an operating system to limit a function of copying a screen.

BACKGROUND ART

A technique for preventing unauthorized use of an application program has been studied. For example, claim 1 of patent document 1 describes a terminal that stores certificate data included in an executable file, in a first storage area, to which access is limited, as a certificate file and that when an updating executable file not including certificate data is delivered to the terminal, uses the certificate file stored in the first storage area upon using an application by executing the updating executable file.

Claim 1 of patent document 2 describes a software starting system that at the start of software, performs certification by comparing two pieces of unique information stored in a storage means and that when both pieces of information do not match, does not start the software.

Claim 1 of patent document 3 describes a program startup control method including an application startup determining step at which the start of an application program is permitted when acquired attribute information and read attribute information match and is not permitted when both pieces of information do not match.

PRIOR ART DOCUMENTS

Patent Documents

Patent document 1: Japanese Unexamined Patent Application Publication No. 2012-38193
Patent document 2: Japanese Unexamined Patent Application Publication No. 2009-80772
Patent document 3: Japanese Unexamined Patent Application Publication No. 2012-88765

SUMMARY OF THE INVENTION

Problems to be Solved by the Invention

Some operating systems offer a function so-called "screen shot", by which a screen displayed by a display device is copied to store a copy of the screen in a storage device. However, some application programs may want screens that they are being executed not copied.

To prevent copying of a screen that an application is being executed, letting the application monitor an operation of issuing a screen shot instruction may be considered. An operating system not requiring such monitoring is known, which does not permit such monitoring because of a security-related demand and instead, limits the above function using data referred to as configuration profile. When a configuration profile is incorporated in the operating system, it limits the function according to the content of the configuration profile and therefore does not copy a screen that an application is being executed. However, the application itself has no means for causing the operating system to limit the above function. This leads to a failure in providing assurance that the screen that the application is being executed is not copied. If the incorporated configuration file is rendered undeletable, the function can be limited when the application is being executed, in which case, however, the function is limited also at execution of a different application, which may impair the convenience of a user.

An object of the present invention is to provide an application program which is executed in an operating system that when having incorporated data for limiting a function of copying a screen, limits the function and which prevents the operating system from copying a screen that the application is being executed.

Means for Solving the Problems

In order to solve the above problems, an application program according to the present invention is provided as a program executed in an operating system that when having incorporated data, with a certificate attached, for limiting a function of copying a screen, limits the function of the operating system and when receiving a request for the result of an inspection to determine whether the incorporated data is valid, sends out the result of the inspection in response to the request. The application program causes a computer controlled by the operating system to function as: a requesting means that at startup or return from a background processing, makes a request to the operating system for the result of the inspection of the data incorporated in the operating system; a display control means that causes a display means to display a given screen; and an instructing means that when an inspection result sent from the operating system in response to a request made by the requesting means indicates that the data is invalid, forbids the display control means to display the given screen and instructs the operating system to incorporate a valid data therein.

The application program according to the present invention may cause the computer to function as a supply means that upon receiving a request from a client program executed by the computer, supplies the data, and may cause the computer to function such that it causes the instructing means to instruct the operating system to start the client program.

The application program according to the present invention may cause the computer to function as a connection-detection requesting means that when the operating system detects a connection state in which one or more display devices different from the display means are connected to the computer, requests the operating system to forbid display of the given screen by the display control means.

An application program according to the present invention is a program executed in an operating system that when having incorporated data, with a certificate attached, for limiting a first function, limits the first function of the operating system and when receiving a request for the result of an inspection to determine whether the incorporated data is valid, sends out the result of the inspection in response to the request. The application program causes a computer controlled by the operating system to function as: a requesting means that at startup or return from a background processing, makes a request to the operating system for the result of the inspection of the data incorporated in the operating system; a providing means that provides a second function; and an instructing means that when an inspection result sent from the operating system in response to a request made by the requesting means indicates that the data is invalid, limits the providing means' providing the second function and instructs the operating system to incorporate a valid data therein.

An application program according to the present invention is a program executed in an operating system that when having incorporated data, with a certificate attached, for making given setting, makes the setting and when receiving a request for the result of an inspection to determine whether the incorporated data is valid, sends out the result of the inspection in response to the request. The application program causes a computer controlled by the operating system to function as: a requesting means that at startup or return from a background processing, makes a request to the operating system for the result of the inspection of the data incorporated in the operating system; a providing means that provides a given function; and an instructing means that when an inspection result sent from the operating system in response to a request made by the requesting means indicates that the data is invalid, limits the providing means' providing the function and instructs the operating system to incorporate a valid data therein.

Effect of the Invention

The present invention prevents an operating system, which when having incorporated data for limiting a function of copying a screen, limits the function, from copying a screen that an application is being executed.

EXPLANATION OF LETTERS OR NUMERALS

1 Terminal
11 Control unit
110 Operating system
1101 Incorporating unit
1102 Copying unit
1103 Inspecting unit
1104 Starting unit
111 App.
1111 Requesting unit
1112 Display control unit
1113 Instructing unit
1114 Supply unit
113 Browser
1131 Configuration profile requesting unit
12 Storage unit
121 Configuration profile area
122 Image data area
123 App. data
1231 Configuration profile
1232 Startup certificate
1233 Profile signature
13 Communication unit
14 Operation unit
15 Display unit
151 VRAM
2 Server
3 Communication line
9 Distribution system
D1 Setting
D2 Public key certificate
D21 Agent name
D22 First public key
D23 Key signature
D3 Message signature
E Code certificate
M Message

MODES FOR CARRYING OUT THE INVENTION

1. Embodiment 1-1. Configuration of Distribution System

Figure 1:
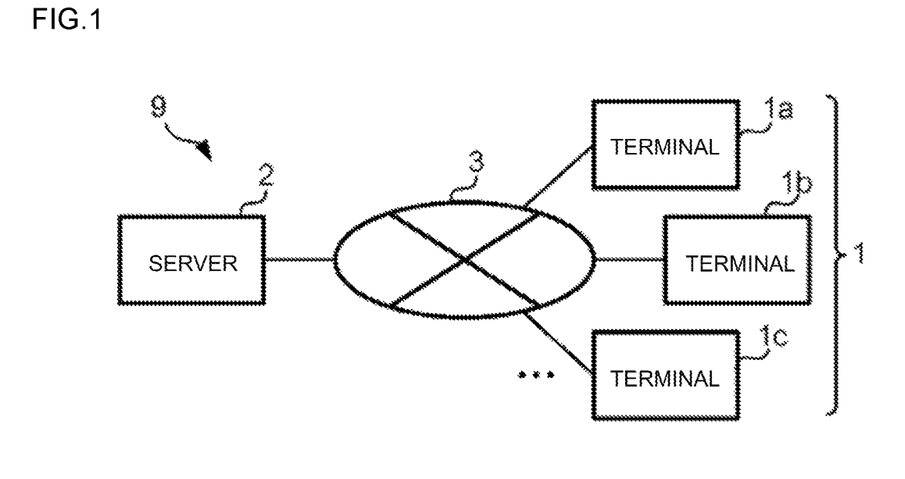
FIG. 1 is a configuration diagram of a distribution system according to an embodiment.

FIG. 1 is a configuration diagram of a distribution system 9 according to an embodiment. The distribution system 9 is a system that distributes an application program (hereinafter, referred to as "app."). A communication line 3 is a line connecting terminals 1a, 1b, and 1c (which are collectively referred to as "terminal 1" when distinguishing them from each other is unnecessary) to a server 2, mediating data exchanges between the terminals and the server. The communication line 3 is, for example, the Internet.

The server 2 is an apparatus that distributes an app. to the terminal 1. In response to a request from the terminal 1, for example, the server 2 allows the terminal 1 to download an app. The terminal 1 is an information processing device that makes a request to the server 2 for an app. and acquires and executes the app. The terminal 1 is provided as, for example, a computer-based device, such as a tablet terminal, mobile phone, personal digital assistant (PDA), portable music player, portable media player, game machine, electronic book viewer, navigation device, and personal computer.

1-2. Configuration of Terminal

Figure 2:
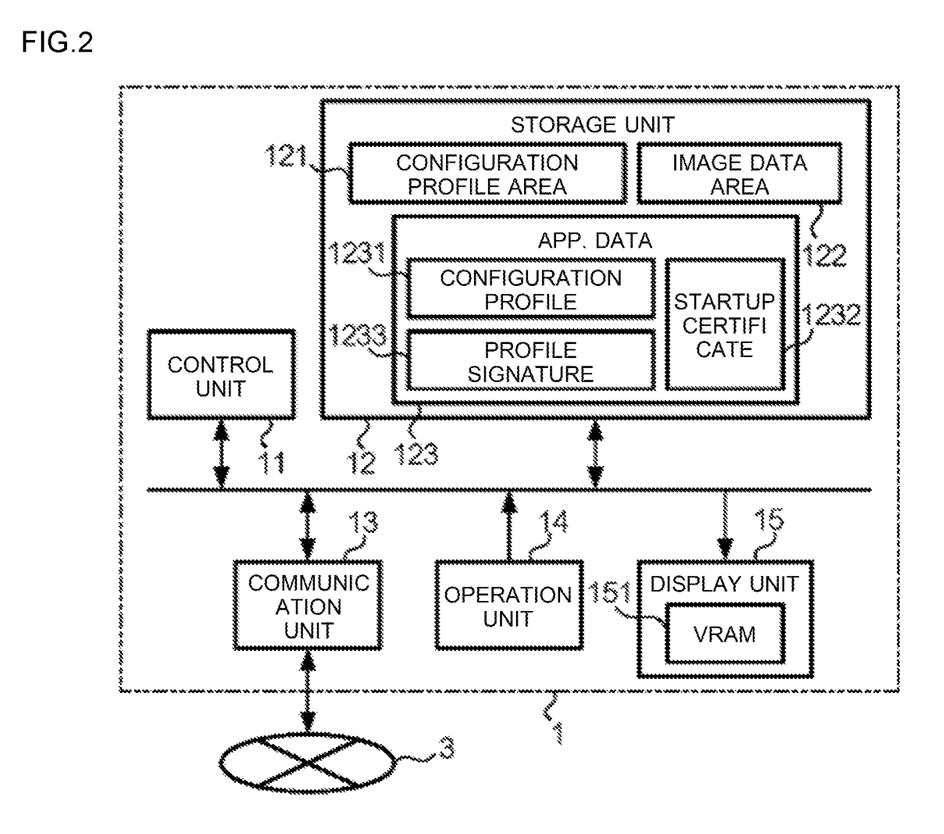
FIG. 2 is a configuration diagram of a terminal.

FIG. 2 is a configuration diagram of the terminal 1. A control unit 11 is a means that controls operations of respective units of the terminal 1. The control unit 11 has an arithmetic processor, such as central processing unit (CPU), and a memory device, such as read only memory (ROM) and random access memory (RAM), and executes programs stored in such memory units. A communication unit 13 is an interface that communicates with the server 2 via the communication line 3 for downloading an app. etc.

A display unit 15 is a display device equipped with a display screen made of liquid crystal, etc. The display unit 15 displays an image according to an instruction from the control unit 11. The display unit 15 has a video random access memory (VRAM) 151, storing image data, which indicates an image to be displayed on the display screen, in the VRAM 15.

An operation unit 14 has a touch panel, button, etc., for inputting various instructions. Upon receiving an operation by a user, the operation unit 14 supplies a signal corresponding to the details of the operation, to the control unit 11.

A storage unit 12 is a storage means, such as solid-state drive (SSD) and flash memory, storing a program to be read by the control unit 11. The storage unit 12 may include a so-called removable disc, which is an attachable/detachable recording medium.

The storage unit 12 has an area in which an operating system is stored, a configuration profile area 121 serving as a storage area in which a configuration profile 1231 is stored and therefore is incorporated in the operating system, and an image data area 122 serving as a storage area in which a copy of image data saved in the VRAM 151 is stored. The storage unit 12 stores app. data 123. The app. data 123 is a data file which includes a group of command codes read into the control unit 11 to function as an app. 111, as well as such resources as the configuration profile 1231, a startup certificate 1232, and a profile signature 1233.

A configuration profile is data that is incorporated in the operating system to limit function of the terminal 1. The configuration profile 1231 is a configuration profile including setting for limiting a function of copying a screen.

Figure 3:
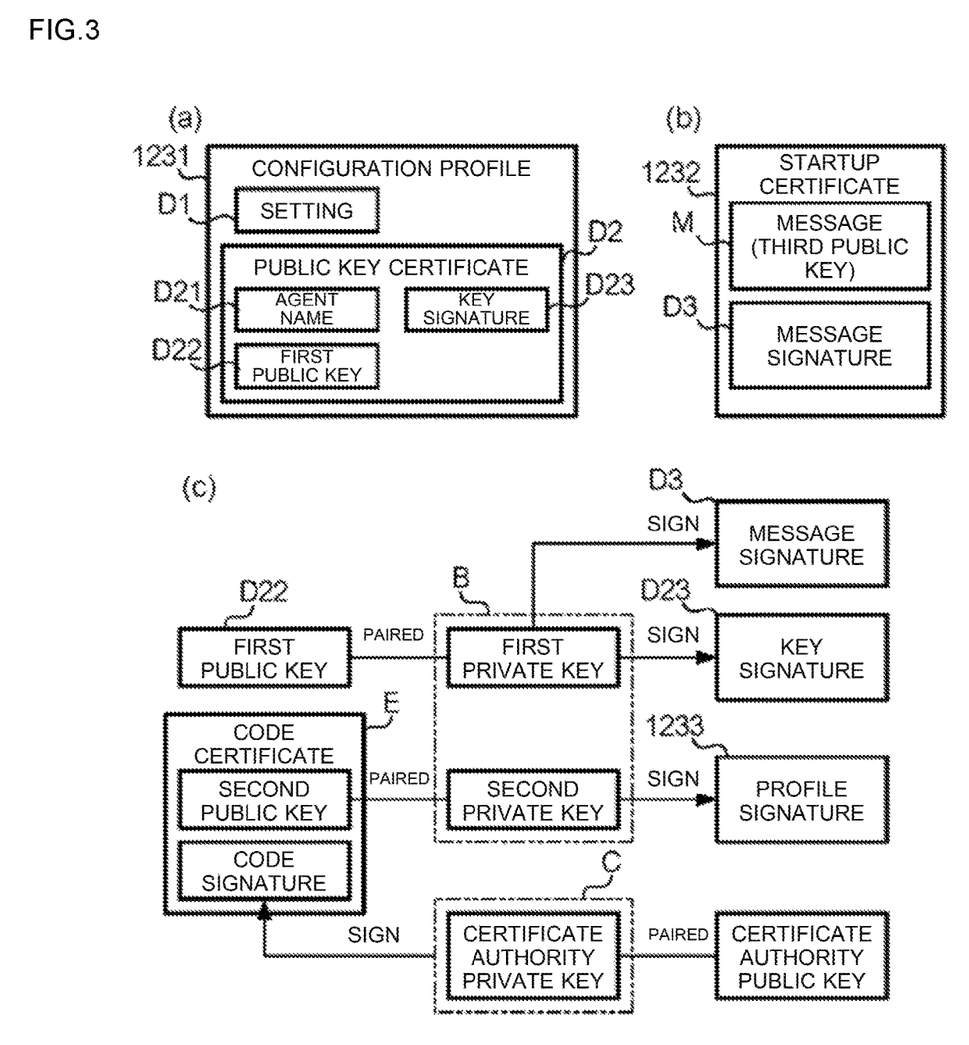
FIG. 3 depicts an example of a configuration profile.

FIG. 3 depicts the configuration profile 1231 and the startup certificate 1232 and also depicts an example of the relationship between the configuration profile 1231 and startup certificate 1232 and keys. As shown in FIG. 3(a), the configuration profile 1231 includes setting D1 and a public key certificate D2.

The setting D1 includes a description of information for limiting the function of the terminal 1, such as "forbid a screen shot".

The public key certificate D2 includes an agent name D21, a first public key D22, and a key signature D23.

The agent name D21 is the name (identification information) of an organization (hereinafter, referred to as "agent") having created the configuration profile 1231. The first public key D22 is a public key for the agent. The key signature D23 is a signature that is created from the first public key D22 using a first private key paired with the first public key D22 for the agent, as shown in FIG. 3(c). In this case, the issuer of the signature coincides with the agent of the public key that is the subject of the signature. The public key certificate D2, therefore, functions as a self-signed certificate.

In FIG. 3(c), information in a range B indicated by a two-dot chain line is information only the agent is allowed to know, while information in a range C is information only the certificate authority is allowed to know.

The startup certificate 1232 is data that the operating system uses to determine whether or not to permit the start of the app. 111. Specifically, as shown in FIG. 3(b), the startup certificate 1232 includes a given message M and a cryptogram, i.e., a message signature D3, created by encrypting unique information (message M itself, its hash values, etc.) retrieved uniquely from the message M, using the first private key for the agent. The message signature D3 of the startup certificate 1232 is decrypted with a public key included in the public key certificate of a configuration profile incorporated in the operating system, and the decrypted message signature D3 is compared with the unique information included in the message M. The decrypted message signature D3 matching the unique information proves that the public key is the first public key D22 for the agent, in which case the start of the app. 111 is permitted.

The message M may be any piece of information. For example, the message M may be a third public key for the agent, which is different from the first public key D22 and from a second public key. In such a case, a third private key paired with this third public key may be not used in the distribution system 9.

A profile signature 1233 is supplied together with the configuration profile 1231, to the operating system, in which the profile signature 1233 is correlated with the configuration profile 1231 and is stored. The profile signature 1233 is a signature for proving that the configuration profile 1231 correlated with the profile signature 1233 is created by the agent and is not falsified. The profile signature 1233 is signed using a second private key for the agent, as shown in FIG. 3(c). The second private key for the agent is paired with the second public key. It is assured by a code certificate E that the second public key is a public key for the agent. Specifically, the code certificate E is created in such a way that a cryptogram is created by encrypting information retrieved uniquely from the second public key (which is called second public key unique information indicative of the second public key itself, hash values, etc.), using a private key of a given certification authority, and is correlated as a code signature, with the second public key.

Decrypting the code signature with a public key of the certificate authority proves that the decrypted code signature matches the second public key unique information. This means that the code signature can be created only by the person who knows the private key of the certificate authority. A person who has acquired the public key of the certificate authority and the code certificate E verifies the code signature with the public key of the certificate authority, thereby obtains an assurance that the second public key is the public key for the agent. The person then verifies the profile signature 1233, using the assured second public key included in the code certificate E, thus obtaining an assurance that the profile signature 1233 is singed using the second private key paired with the second public key.

Because the second public key paired with the second private key is authenticated by the certificate authority, which is a reliable third party institution, the second private key, which is used for creating the profile signature 1233, may also be used for creating a certificate that certifies the original creator of a group of command codes included in the app. data 123, that is, a code signing certificate.

1-3. Functional Configuration of Terminal

Figure 4:
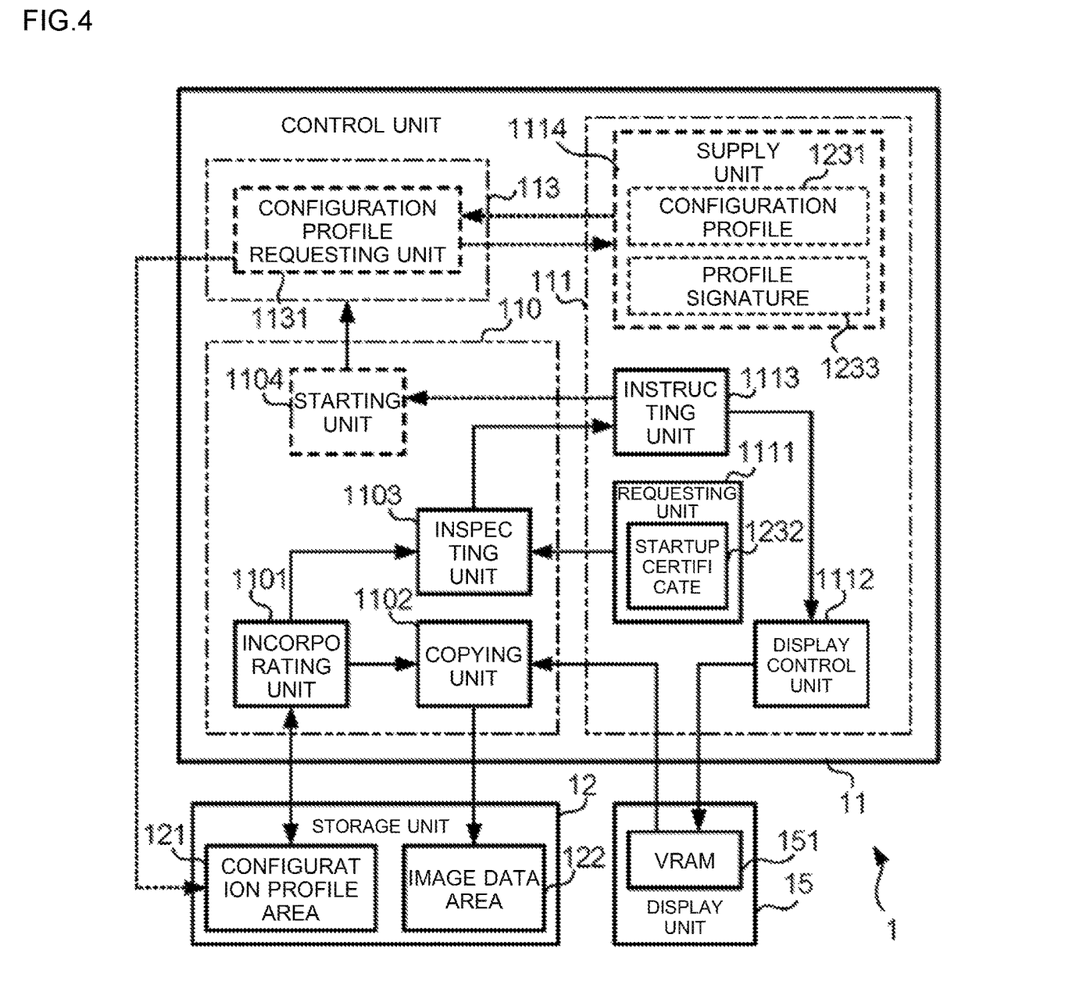
FIG. 4 is a functional configuration diagram of the terminal.

FIG. 4 is a functional configuration diagram of the terminal 1. The control unit 11 executes an operating system 110. Under an environment in which the operating system 110 is executed, the control unit 11 reads the app. data 123 out from the storage unit 12 and executes the app. 111. The operating system 110 functions as an incorporating unit 1101, a copying unit 1102, and an inspecting unit 1103.

When the operation unit 14, etc., is operated to supply the terminal 1 with power, the control unit 11 reads the operating system 110 out from the storage unit 12 as a boot loader stored in advance in a ROM runs. The incorporating unit 1101 checks the configuration profile area 121 of the storage unit 12, and when finding a configuration profile instructed to be incorporated in the operating system 110, incorporates the configuration profile in the operating system 110.

When an operation made by the user on the operation unit 14 is an instruction to copy a screen, the copying unit 1102 reads image data indicative of an image displayed by the display unit 15, out from the VRAM 151 of the display unit 15 and copies the image data to an image data area 122 in the storage unit 12. However, when the configuration profile incorporated in the operating system 110 by the incorporating unit 1101 forbids copying of an image, the copying unit 1102 does not copy the above image data.

When receiving a request from the app. 111 for verifying the message signature D3 of the startup certificate 1232 using the public key included in the public key certificate of the configuration profile, the inspecting unit 1103 sends out the result of the verification in response to the request. When the operating system 110 has no configuration profile incorporated, or an incorporated configuration profile does not include a public key certificate, or verification of the public key certificate included in the incorporated configuration profile ends up in a failure, the above result of the verification indicates no matching. When the verification of the public key certificate included in the incorporated configuration profile is successful, in contrast, the result of the verification indicates matching.

The app. 111 functions as a requesting unit 1111, a display control unit 1112, and an instructing unit 1113. At startup of the app. 111 or its return from a background processing, to determine whether a configuration profile the operating system 110 has incorporated is the valid configuration profile, the requesting unit 1111 requests the operating system 110 to verify the message signature D3 of the startup certificate 1232. This verification is carried out by the following procedure: (1) identifying the issuer of the startup certificate 1232, (2) searching the operating system 110 to find a public key for the identified issuer in the operating system 110, and (3) verifying the message signature D3 of the startup certificate 1232, using the found public key. The operating system 110 finds the above public key in the public key certificate of the incorporated configuration profile, decrypts the message signature D3 using the public key, and compares the decrypted message signature D3 with the unique information of the message M to judge whether the message signature D3 matches the unique information.

When the operating system 110 has a configuration profile incorporated therein and the configuration profile includes a public key certificate, the operating system 110 extracts a public key from the public key certificate and verifies the message signature D3 of the startup certificate 1232, using the extracted public key. The operating system 110 then sends the result of the verification to the app. 111 in response to its request. When the result of the verification indicates matching, that is, the verification is successful, the app. 111, based on such a verification result, concludes that the configuration profile 1231 having been included in the app. 111 is now incorporated validly in the operating system 110. When the result of the verification indicates no matching, that is, the verification has ended up in a failure, the app. 111, based on such a verification result, concludes that the configuration profile is invalid. At this time, because the startup certificate 1232 is signed using the first private key paired with the first public key D22, if the first public key D22 supplied as the configuration profile is incorporated in the operating system 110, that is, if setting for forbidding a screen shot is incorporated in the operating system 110, the startup certificate 1232 is judged to be the valid certificate. If the first public key D22 is not incorporated in the operating system 110, the startup certificate 1232 is not judged to be the valid certificate.

Shifts of states of an app. will be described. In the following description, foreground and background represent statuses of an app. at the control unit 11. The operating system 110 puts one of apps on execution, in the foreground while putting the other apps in the background. The operating system 110 then allows the app. in the foreground to exclusively use a specified one of resources each of which is a unique resource in the terminal 1. For example, the operating system 110 allows the app. in the foreground to exclusively use the display unit 15. At the same time, the operating system 110 places restrictions to an app. in the background on their use of resources.

Figure 5:
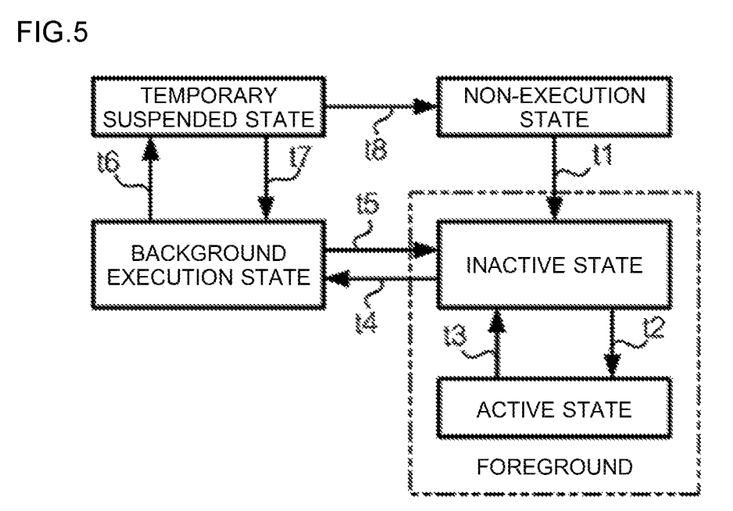
FIG. 5 is an explanatory diagram of shifts of states of an app.

FIG. 5 is an explanatory diagram of shifts of states of an app. Apps including the app. 111 that are started by the operating system 110, for example, become any one of the following five states shown in FIG. 5.

"Non-execution state" is a state in which an app. is not started or is ended by the operating system 110.

"Inactive state" is a state in which an app. is being executed in the foreground and has not received any event.

When an app. is started, the app. in its "non-execution state" shifts to "inactive state", as indicated by an arrow t1. Events occur in various forms, such as an operation by the user on the operation unit 14, an interruption request, and an incoming call to the terminal 1 serving as a phone. When these events occur, a prescribed control signal is transmitted to the control unit 11 according to each type of event.

"Active state" is a state in which an app. is being executed in the foreground and has received an event. For example, when a given time has passed after an app. shifts to "inactive state" following its start, the app. in its "inactive state" shifts to "active state", as indicated by an arrow t2. Before shifting to a different state because of a received event, the app. in its "active state" shifts first to "inactive state", as indicated by an arrow t3. Following its shift to "inactive state", the app. then shifts to the different state.

"Background execution state" is a state in which an app. is being executed in the background. For example, when an interruption event has occurred, the operating system 110 moves a different app. corresponding to the occurred event to the foreground while moves the app. 111 from the foreground to the background. In this process, the app. 111 in its "inactive state" shifts from "inactive state" to "background execution state", as indicated by an arrow t4. Meanwhile, the above different app. in its "background execution state" shifts from "background execution state" to "inactive state", as indicated by an arrow t5.

"Temporary suspended state" is a state in which an app. is in the background and is not being executed. For example, when a given time has passed since an app. has become "background state", the app. in its "background execution state" shifts to "temporary suspended state", as indicated by an arrow t6. When an instruction to resume execution of the app. is issued at the occurrence of an interruption event, etc., on the other hand, it causes the app. in its "temporary suspended state" to shift to "background execution state", as indicated by an arrow t7.

When such an event as detection of a memory shortage has occurred, for example, the operating system 110 deletes an app. having shifted to "temporary suspended state", from the RAM of the control unit 11 in order to ensure a state of execution of a different app. in the foreground. This causes the app. in "temporary suspended state" to shifts to "non-execution state", as indicated by an arrow t8, which means that the app. is ended.

The state shift indicated by the arrow t1 of FIG. 5 occurs at the start of the app. The state shift indicated by the arrow t5 of FIG. 5 occurs when the app. returns from a background process to a foreground process. When the state shift indicated by the arrow t1 or t5 of FIG. 5 has occurred, the requiring unit 1111 of FIG. 4 requests the operating system to verify the message signature D3 of the startup certificate 1232 using the public key included in the public key certificate of the configuration profile. This is because that a configuration profile is deleted or incorporated only when a different app. running on the operating system 110 is in the foreground.

Specifically, when the app. 111 is started, the operating system may have a case where a configuration profile is incorporated or deleted before the actual start of the app. 111. Even after the start of the app. 111, if the app. 111 has been moved to the background, the operating system may have a case where a different app. in the foreground incorporates or deletes a configuration profile in or from the operating system while the app. 111 remains in the background. Thus, in these cases, the app. 111 judges whether the valid configuration profile 1231 is incorporated in the operating system 110.

The display control unit 1112 of FIG. 4 causes the display unit 15 to display a given screen. A given screen shows information provided by the app. 111 itself or information the app. 111 acquires from the server 2, etc., via the communication line 3. Such information may include confidential information.

The instructing unit 1113 forbids the display control unit 1112 to display the given screen when a verification result sent as a response from the operating system 110 indicates that the public key certificate is invalid. In this case, the instructing unit 1113 instructs the operating system 110 to incorporate the valid configuration profile 1231.

1-4. Operation of Terminal

Figure 6:
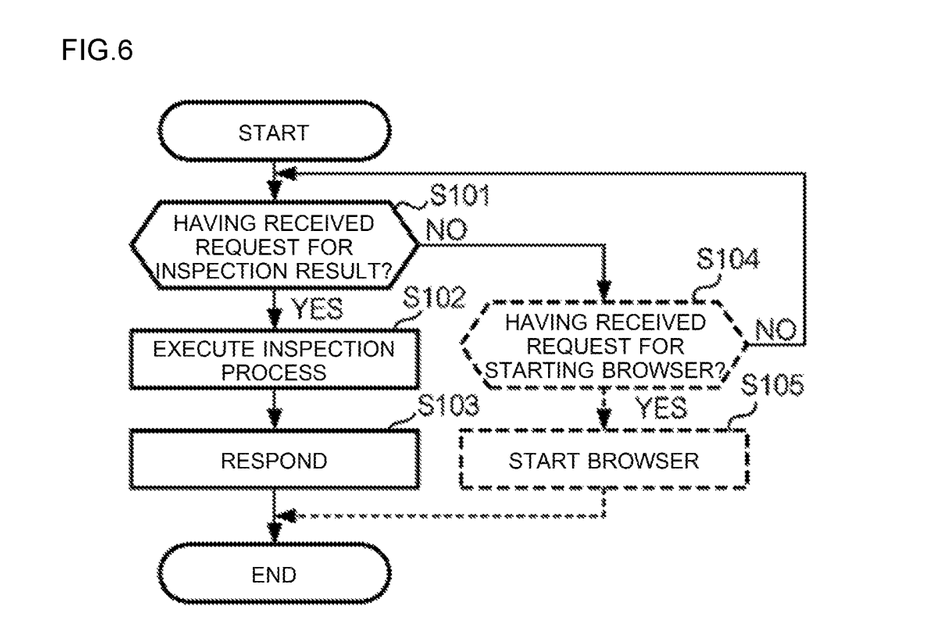
FIG. 6 is a flowchart of an operation of an operating system executed at the terminal.

FIG. 6 is a flowchart of an operation of the operating system 110 executed at the terminal 1. The control unit 11 that executes the operating system 110 judges whether it has received a request from the app. 111 for the result of a verification of the startup certificate 1232 (result of an inspection of a configuration profile) (step S101). The control unit 11 keeps making this judgment while the control unit 11 is judging that the control unit 11 has not received the request for the result of the verification (result of the inspection) (step S101: NO). When judging that it has received the request for the result of the verification (step S101: YES), the control unit 11 executes a process of a verification (process of an inspection) of the startup certificate 1232 (step S102).

The process of the verification is carried out by the following procedure.

Upon making a request for the result of the verification, the app. 111 presents the startup certificate 1232. The control unit 11 extracts a public key for the issuer of the startup certificate 1232 from a public key certificate incorporated in the operating system 110, and verifies the public key itself using the public key and the startup certificate 1232.

The control unit 11 carries out a verification of the public key itself, for example, in such a way that the control unit 11 decrypts the message signature D3 included in the startup certificate 1232, using the above public key, to create a plain text P and then compares the plan text P with the unique information of the message M included in the startup certificate 1232 to judge whether the plain text P matches the unique information.

A success in the above verification proves the public key to be the first public key D22, in which case the control unit 11 sends out the result of verification of the startup certificate 1232 as a successful verification, in response to the request. A failure in the verification, on the other hand, causes the control unit 11 to send out the result of verification of the startup certificate 1232 as a failed verification, in response to the request (step S103).

Figure 7:
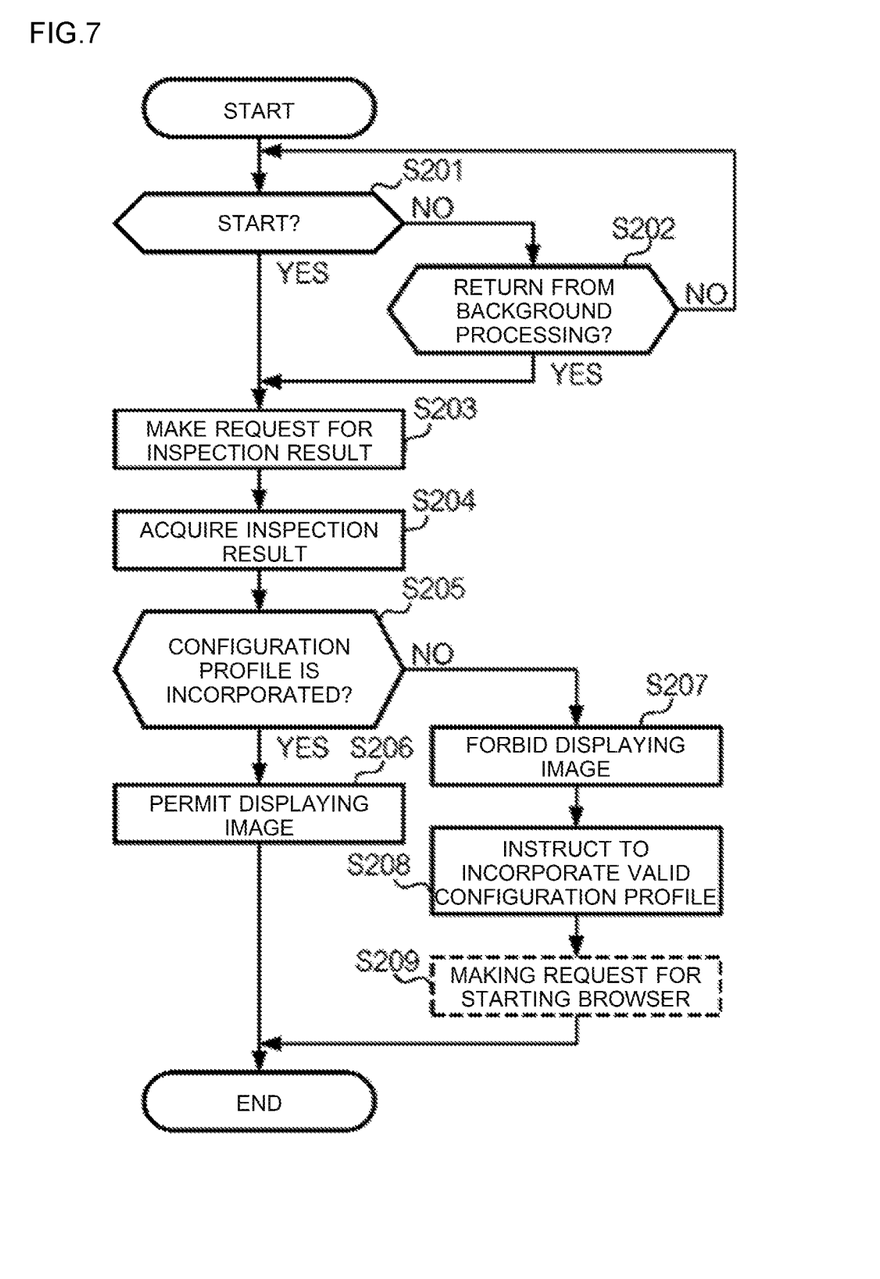
FIG. 7 is a flowchart of an operation of an app. executed by the terminal.

FIG. 7 is a flowchart of an operation of the app. 111 executed at the terminal 1. The control unit 11 that executes the app. 111 judges whether the app. 111 has been started first, that is, whether the app. 111 is in a state of being right after its startup. When judging that the app. 111 is in the state of being right after its startup (step S201: YES), the control unit 11 proceeds to step S203. When judging that the app. 111 is not in the state of being right after its startup (step S201: NO), the control unit 11 judges whether the app. 111 has returned from the background processing, that is, whether the app. 111 is in a state of being right after its return from the background processing (step S202). When judging that the app. 111 is not in the state of being right after its startup and not in the state of being right after its return from the background processing, either (step S202: NO), the control unit 11 returns to the step S201. When judging that the app. 111 is in the state of being right after its return from the background processing (step S202: YES), the control unit 11 proceeds to step S203.

At step S203, to check whether the configuration profile 1231 having been included in the app. 111 is now incorporated validly into the operation system 110, the control unit 11 makes a request to the operating system 110 for the result of a verification (result of an inspection) of the startup certificate 1232 (step S203). When the operating system 110 sends the result of the verification in response to the request, the control unit 11 acquires the result of the verification (result of the inspection) (step S204), and judges whether the configuration profile 1231 is incorporated validly in the operating system 110 (step S205).

When judging that the configuration profile 1231 is incorporated validly in the operating system 110 (step S205: YES), the control unit 11 permits the display unit 15 to display a given screen (step S206). When judging that the configuration profile 1231 is not incorporated validly in the operating system 110 (step S205: NO), the control unit 11 forbids the display unit 15 to display the given screen (step S207), and instructs the operating system 110 to incorporate the valid configuration profile (step S208).

Through the above steps, the app. 111 does not permit the display unit 15 to display the given screen unless the valid configuration profile with a certificate attached is in incorporated in the operating system 110. This ensures that a screen that the app. 111 is being executed is not copied.

2. Modifications

The embodiment has been described above. The details of the embodiment may be modified to provide the following modifications. The following modifications may be combined to provide a different modification.

2-1. First Modification

In the above embodiment, when judging that the configuration profile is invalid, the control unit 11 forbids the display unit 15 to display the given screen and instructs the operating system 110 to incorporate the valid configuration profile. In this case, the control unit 11 may instruct the operating system 110 to start a client program that makes a request for the valid configuration profile.

In this case, when the result of the verification sent from the inspecting unit 1103 as a response indicates that the configuration profile is invalid, the instructing unit 1113 of FIG. 4 specifies, for example, a uniform resource identifier (URI) to the operating system 110 and instructs the operating system 110 to start a browser 113 for accessing a Web site whose location is identified with the URI.

If the above URI is directly embedded in the app. 111, a different app. on execution at the terminal 1 may possibly steel the URI. To prevent this, the app. 111 may specify a URI at least including, as part of the URI, values generated at execution of the app. 111, to the operating system 110. For example, at execution of the app. 111, the app. 111 specifies to the operating system 110, for example, a URI expressed as a character string "https://localhost:234/DSP/profile.html" and prompts the browser 113 to start. "234" included in the character string represents a port number, which is generated based on, for example, pseudorandom numbers created from a date, etc. As a result, even if a different app. tries to steel a URI specified by the app. 111, referring to the app. 111 before its start, this try is highly likely to end up in a failure because at this point, values generated at execution of the app. 111 are not included in the URI at least as its part.

When instructed to start the browser 113, the operating system 110 functions as a starting unit 1104 indicated by a broken line in FIG. 4. The starting unit 1104 reads the specified browser 113 out from the storage unit 12 and starts the browser 113.

The browser 113 is a client program that makes a request to the app. 111 for the valid configuration profile. The browser 113 is provided as, for example, a Web browser, identifying the location of data based on a URI specified by the instructing unit 113 and making a request, such as a hypertext transfer protocol (http) request, for the data. After executing the browser 113, the control unit 11 functions as a configuration profile requesting unit 1131, which is indicated by a broken line in FIG. 4. The configuration profile requesting unit 1131 makes a request to the app. 111 for the valid configuration profile 1231.

The app. 111 has a built-in Web server function, storing therein the valid configuration profile 1231, as described above. When the browser 113 makes a request to the app. 111 for the valid configuration profile 1231, using, for example, the above URI, the app. 111 functions as a supply unit 1114, which is indicated by a broken line in FIG. 4. Meeting the request from the browser 113, the supply unit 1114 supplies a set of the valid configuration profile 1231 and profile signature 1233 to the browser 113. The supplied valid configuration profile 1231 and profile signature 1233 are stored by the browser 113, in the configuration profile area 121 of the storage unit 12 and are incorporated by the incorporating unit 1101, into the operating system 110. The above Web server function of the app. 111 may be limited to a function of receiving only the request from a client program being executed at the terminal 1 that executes the app. 111. The app. 111 specifies a URI to the operating system 110 and receives a request for the valid configuration profile 1231, which is made, using the URI, by the browser 113 started by the operating system 110. Thus, when pseudorandom numbers are included in a URI, for example, the app. 111 determines the URI including the pseudorandom numbers to be a right URI for providing the valid configuration profile 1231.

In this modification, an operation of the control unit 11 that executes the operating system 110 includes steps indicated by broken lines in FIG. 6. When judging that it has received no request for a verification result (step S101: NO), the control unit 11 judges whether it has received a request for the start of the browser 113 (step S104). While judging that it has received no request for the start of the browser 113 (step S101: NO), the control unit 11 returns to step S101. When judging that it has received a request for the start of the browser 113 (step S101: YES), the control unit 11 starts the browser 113 according to the request and lets the app. 111 access a URI that allows the app. 111 to supply the valid configuration file 1231 (step S105).

In this modification, an operation of the control unit 11 that executes the app. 111 includes a step indicated by a broken line in FIG. 7. When judging that a configuration profile is invalid (step S205: NO), the control unit 11 forbids the display unit 15 to display a given screen (step S207), and instructs the operating system 110 to incorporate the valid configuration profile 1231 (step S208). The control unit 11 also requests the operating system 110 to start the above browser 113 (step S209). In this process flow, the order of execution of steps S207 to S209 is not limited to the order indicated above.

According to a configuration of this modification, the terminal 1 acquires the valid configuration profile 1231 directly from the app. 111. Even if the valid configuration profile 1231 is not found in an external device, such as server 2, connected to the terminal 1 via the communication line 3, therefore, the terminal 1 can cause the display unit 15 to display the given screen put under management by the app. 111. According to this configuration, even in a situation where connection to the communication line 3 is impossible, the valid configuration profile 1231 can be incorporated in the operating system 110.

2-2. Second Modification

For example, the configuration profile area 121 of the storage unit 12 may put limitations on the user's access to the configuration profile area 121. Specifically, when the user carries out an operation for storing a configuration profile in the configuration profile area 121, the operating system 110 may judge whether the configuration profile is falsified, using the second public key acquired from the code certificate E. Only when judging the configuration profile to be not a falsified one, the operating system. 110 stores this configuration profile in the configuration profile area 121, as the valid configuration profile. The operating system 110 then incorporates therein the configuration profile that is stored in the configuration profile area 121 as the valid configuration profile. In this manner, as far as the above limitations on the user's assess remains effective, a configuration profile being stored in the configuration profile area 121 provides an assurance that the configuration profile is not falsified and is incorporated in the operating system 110.

In this case, when the operating system 110 eliminates the incorporated configuration profile, the operating system 110 deletes or transfers the configuration profile from the configuration profile area 121. When receiving a request from the app. 111 for the result of a verification of the startup certificate 1232, the control unit 11 reads the configuration profile out from the configuration profile area 121 and, using the public key extracted from the public key certificate included in the configuration profile and the startup certificate 1232, verifies the public key itself. When judging the public key to be valid, the control unit 11 sends the result of the verification indicating such a judgment, in response to the request. When the configuration profile is deleted or transferred and is therefore not stored in the configuration profile area 121, the control unit 11 sends the result of the verification indicating the configuration profile is invalid, in response to the request. In short, when the control unit 11 judges that it has received a request for the result of a verification of the configuration file, the control unit 11 sends the result of the verification in response to the request.

2-3. Third Modification

In the above embodiment, an app. executed by the control unit 11 of the terminal 1 is delivered from the server 2 via the communication line 3. Such an app. may be provided in its state of storage in a magnetic recording medium, such as magnetic tape or magnetic disk, an optical recording medium, such as optical disc, in a magneto-optic recording medium, or in a computer-readable medium, such as semiconductor memory. In such a case, the presence of the distribution system 9 may be unnecessary because what the terminal 1 needs to do is to copy an app. stored in the above medium, to the storage unit 12. A control means, an example of which is described above as the control unit 11, may be provided as various devices other than the CPU. For example, a dedicated processor may serve as the control means.

2-4. Fourth Modification

In the above embodiment, to determine whether a configuration profile the operating system 110 has incorporated is the valid configuration profile, the app. 111 makes a request for verifying the message signature D3 of the startup certificate 1232 using the public key included in the public key certificate of the configuration profile incorporated in the operating system 110. However, if the operating system 110 can inspect the configuration profile to determine whether it is the valid configuration profile, the app. 111 may directly request the operation system 110 to carry out such an inspection. Such a "configuration profile inspection" is an inspection to determine whether the operating system 110 has incorporated the valid configuration profile.

According to the above embodiment, the operating system 110 cannot directly carryout the "configuration profile inspection". The "configuration profile inspection" is, therefore, carried out by judging whether the startup certificate 1232 included in the app. data 123 is created with the first private key paired with the first public key D22.

According to the above embodiment, when the startup certificate 1232 is judged to be a certificate that is created with a private key paired with the first public key D22, the configuration profile 1231 including the first public key D22 is judged to be the valid configuration profile. Since the startup certificate 1232 is signed using the first private key paired with the first public key D22, when the first public key D22 included in the configuration profile is incorporated in the operating system, the startup certificate 1232 is judged to be the certificate that is created with the private key paired with the first public key D22, which means that the configuration profile is judged to be valid.

When a configuration profile including the first public key D22 is not incorporated in the operating system 110, the configuration profile is judged to be invalid (or it is judged that the operating system 110 has not incorporated the valid configuration profile). When the operating system 110 has no configuration profile incorporated therein, or an incorporated configuration profile does not include the public key certificate, or verification of the public key certificate included in an incorporated configuration profile fails, the inspecting unit 1103 of the operating system 110 sends an inspection result indicating the configuration profile is invalid, to the app. 111.

2-5. Fifth Modification

The terminal 1 may be provided with an interface that connects an external device to the terminal 1. In such a case, the operating system 110 may detect a state of connection between the terminal 1 and an external display device and notify the app. 111 of the detected state of connection.

In this case, for example, the app. 111 requests the operating system 110 to detect connection of an external display device to the terminal 1 or disconnection of an external display device from the terminal 1 and notify the app. 111 of the detected fact. In response to this request, the operating system 110 monitors the above interface and sends a notification of a state of connection between the terminal 1 and the external display device, to the app. 111. Receiving the notification of the state of connection between the terminal 1 and the external display device, the app. 111 makes a request to the operating system 110 for forbidding display of a screen when, for example, one or more external display devices are connected to the terminal 1. Receiving the request, the operating system 110 forbids display of a screen generated by the app. 111. In this case, the operating system 110 may cause such a warning "disconnect all display devices to execute app. normally" to be displayed in place of the screen of which display is forbidden.

When all external display devices are disconnected to leave the display unit 15 only as a display device under control by the terminal 1, the app. 111 cancels the above request for forbidding display of the screen. This process reduces a possibility that a screen generated by the app. 111 is displayed on a display device other than the display unit 15.

2-6. Sixth Modification

According to the above embodiment, the configuration profile 1231 includes the setting D1 for limiting the screen copying function, such as a statement "forbid a screen shot". The setting D1 may include setting for limiting a given function other than the screen copying function (hereinafter, referred to as "first function"). In other words, in such a case, the configuration profile should be data with a certificate attached, which data limits the first function of the terminal 1 when incorporated in the operating system. When having incorporated such a configuration profile, the operating system executed at the terminal 1 limits the above first function of the terminal 1, and when receiving a request for the result of an inspection to determine whether the incorporated configuration profile is the valid data, the operating system sends out the result of the inspection in response to the request.

In this case, when the result of the inspection sent as a response from the operating system 110 indicates that the public key certificate is invalid, the instructing unit 1113 achieved by the control unit 11 may limit a function of the terminal 1 that is provided by executing the app. 111 (hereinafter, referred to as "second function"). This second function refers to, for example, output of a given sound, execution of a given calculation, etc., in addition to display of a given screen by the display control unit 1112, as mentioned above. In other words, the display control unit 1112 is an example of a providing means that provides the second function. For example, when the second function is a function of outputting a given sound, a sound control unit that controls a speaker system to cause it to output a sound is equivalent to the providing means that provides the second function.

"First function" limited by the setting D1 is, for example, a function of accessing a specific network or server, a function of reproducing a sound, etc., a function of starting a specific app., widget, etc., a function of communicating through a wired or wireless communication interface, and so forth.

According to the above embodiment, the instructing unit 1113 limits the first function according to the setting D1 included in the configuration profile 1231. In this case, the setting D1 represents "specific setup". "Specific setup" includes setup for connection to a wireless LAN, setup for connection to a printer, setup for making an e-mail account work, setup for connection to a virtual private network, setup for making password-based access limitations, and setup for installing a specific electronic certificate. Thus, when the public key certificate is judged to be invalid, the terminal 1 instructs the operating system 110 to incorporate the valid configuration profile 1231, thus forcing the operating system 110 to incorporate the above specific setup.

What is claimed is:

1. A non-transitory computer-readable storage medium storing:
    an operating system having a function of copying a screen shown on a display while an application program is executed on the operating system;

a configuration profile of the operating system to restrict the function of copying, the configuration profile including a public key relating to the application program; and the application program that is executed on the operating system, the application program including a certificate including a signature, the certificate corresponding to the application program and being independent from a computer, the application program, while being executed on the operating system, causing the computer controlled by the operating system to:

present the certificate included in the application program, to the operating system;

request the operating system to verify the signature included in the certificate with the public key included in the configuration profile incorporated in the operating system in response to starting-up of the application program or to return from a background processing to the application program;

instruct the display to restrict showing the screen of the application program in response to a result showing that a verification of the signature is failure; and instruct the display to show the screen of the application program in response to a result showing that the verification of the signature is successful.

2. The non-transitory computer-readable storage medium according to claim 1, wherein in response to the result showing that the verification of the signature is failure, the application program causes the computer to instruct the operating system to start a client program, the client program being a program for incorporating a new configuration profile into the operating system, upon receiving an instruction to start the client program, the application program causes the computer to instruct the operating system to start the client program, the application program causes the computer to execute the client program and to request the application program to supply the new configuration profile, upon receiving a request from the client program, the application program is configured to supply the new configuration profile to the client program, and upon receiving the new configuration profile, the computer executing the client program is configured to incorporate the new configuration profile into the operating system.

3. The non-transitory computer-readable storage medium according to claim 1, wherein the application program causes the computer to forbid display of the given screen in response to the operating system detecting that an external display device is connected to the computer.

4. A computer comprising:
a processor;
a memory; and
a display, wherein
the memory is configured to store:
an operating system for controlling the computer, the operating system having a function of copying a screen shown on the display while an application program is executed on the operating system;
a configuration profile of the operating system to restrict the function of copying, the configuration profile including a public key relating to the application program; and
the application program that is executed on the operating system, the application program including a certificate including a signature, the certificate corresponding to the application program and being independent from the computer, the processor executes the application program, which is being executed on the operating system, to:
present the certificate included in the application program, to the operating system;
request the operating system to verify the signature included in the certificate with the public key included in the configuration profile incorporated in the operating system in response to starting-up of the application program or to return from a background processing to the application program;
instruct the display to restrict showing the screen of the application program in response to a result showing that a verification of the signature is failure; and
instruct the display to show the screen of the application program in response to a result showing that the verification of the signature is successful.

5. The computer according to claim 4, wherein
in response to the result showing that the verification of the signature is failure, the processor executing the application program is configured to instruct the operating system to start a client program, the client program being a program for incorporating a new configuration profile into the operating system,
upon receiving an instruction to start the client program, the processor executing the operating system is configured to start the client program,
the processor executing the client program is configured to request the application program to supply the new configuration profile,
upon receiving a request from the client program, the processor executing the application program is configured to supply the new configuration profile to the client program, and
upon receiving the new configuration profile, the processor executing the client program is configured to incorporate the new configuration profile into the operating system.

6. The computer according to claim 4, wherein
in response to the operating system detecting that an external display device is connected to the computer, the processor executing the application program is configured to forbid display of the given screen.

7. An executing method of an application program while being executed on an operating system, on a computer controlled by the operating system having a function of copying a screen shown on a display while the application program is executed on the operating system, the computer comprising a memory storing the operating system, the application program and a configuration profile of the operating system to restrict the function of copying, the configuration profile including a public key relating to the application program, the application program including a certificate including a signature, the certificate corresponding to the application program and being independent from the computer, the method comprising:

presenting the certificate included in the application program, to the operating system;
requesting the operating system to verify the signature included in the certificate with the public key included in the configuration profile incorporated in the operating system in response to starting-up of the application program or to return from a background processing of the application program;

instructing the display to restrict showing the screen of the application program in response to a result showing that a verification of the signature is failure; and instructing the display to show the screen of the application program in response to a result showing that the verification of the signature is successful.

8. The method according to claim 7, further comprising:

in response to the result showing that the verification of the signature is failure, instructing the operating system to start a client program, the client program being a program for incorporating a new configuration profile into the operating system;

upon receiving an instruction to start the client program, starting the client program by the operating system;

requesting the application program to supply the new configuration profile;

upon receiving a request from the client program executed by the computer, supplying the new configuration profile to the client program; and upon receiving the new configuration profile, incorporating the new configuration profile into the operating system.

9. The method according to claim 7, further comprising:

requesting the operating system to forbid display of the given screen in response to the operating system detecting that an external display device is connected to the computer.

10. The non-transitory computer-readable storage medium according to claim 2, wherein the application program has a function of a web server, the client program is a web browser program, the processor executing the application program is configured to instruct the operating system to start the web browser program for accessing a resource with a URI, the URI being specified by the application program and identifying the web server of the application program, the processor executing the web browser program is configured to send a HTTP request for requesting a new configuration profile, to the web server.

11. The computer according to claim 5, wherein the application program has a function of a web server, the client program is a web browser program, the processor executing the application program is configured to instruct the operating system to start the web browser program for accessing a resource with a URI, the URI being specified by the application program and identifying the web server of the application program, the processor executing the web browser program is configured to send a HTTP request for requesting the new configuration profile, to the web server.

12. The method according to claim 8, wherein the application program has a function of a web server, the client program is a web browser program, the method further comprising:

instructing the operating system to start the web browser program for accessing a resource with a URI, the URI being specified by the application program and identifying the web server of the application program; and sending a HTTP request for requesting a new configuration profile, to the web server.

13. The non-transitory computer-readable storage medium according to claim 1, wherein the configuration profile includes a second certificate including the public key.

14. The non-transitory computer-readable storage medium according to claim 13, wherein the second certificate is a self-signed certificate.

* * * * *